Nov. 25, 1958

W. WEIGL ET AL 2,862,148

VEHICLE LIGHT CONTROL SYSTEM

Filed Jan. 28, 1957

INVENTORS
WILLIAM WEIGL
ROBERT K. NORTON

BY

William Weigl

AGENT

United States Patent Office 2,862,148
Patented Nov. 25, 1958

2,862,148

VEHICLE LIGHT CONTROL SYSTEM

William Weigl, Cleveland, and Robert K. Norton, Twinsburg, Ohio

Application January 28, 1957, Serial No. 636,827

17 Claims. (Cl. 315—30)

This invention relates generally to a control system for electrical apparatus of automobiles or similar vehicles. In particular, it relates to means for automatically turning off the headlights or parking lights of an automobile when the ignition key is turned off.

Numerous attempts have been made to warn an automobile operator that his lights are on when the ignition is turned off. The known ways of accomplising this objective are by providing some sort of signal means, visual, audible, or both, to call to the operator's attention when he performs some function such as turning off his ignition key or opens the door of the car, that the lights are "on" and should be extinguished.

While most people have accidentally left the driving lights of their automobiles on at one time or another, this is not too common an occurrence. While the present invention solves that problem, the usual trouble which the invention sets out to overcome is that in which the parking lights rather than the headlights are left on. It is not uncommon to find automobiles in employee parking lots with their parking lights on, especially in the winter when the days are short and workers leave their homes while it is still dark enough to require that the parking lights be used on the way to work. When arriving at work, if it is light enough, the operator may not notice that his dashboard lights are on when he turns off the ignition key. When he returns to his auto after his work day, it is possible that he may find his battery completely run down.

This, and the turning on of headlights or parking lights while passing through a fog, a tunnel, etc. are altogether too well understood by motorists to require much discussion. These are some of the obstacles which the warning devices previously referred to were designed to overcome. For some reason, however, the public has not generally accepted these devices, perhaps because the buzzers or flashers become obnoxious to the operator and he'd rather take a chance on his memory to turn off his lights.

The principal object of this invention is to provide means for automatically opening the light switch for the headlights or parking lights of an automobile upon turning off the ignition or performing some other function normally performed whenever leaving the automobile.

Another object of the invention is to provide for manual control of the headlights or parking lights at any time independently of the on or off condition of the ignition system of the auto.

A more specific object is to provide light switch means which may be manually closed whenever desired, and electrical means operable in response to turning off the ignition key to automatically open the light switch.

Another object of the invention is to provide a light switch which is manually operated to closed position and adapted to be maintained in closed position, and in which means is provided to automatically release the maintaining means upon turning off the engine of the automobile to permit the light switch to be automatically opened.

It is an object of the preferred form of the invention to provide electrically operated means for automatically turning off the lights of an automobile in response to opening of the ignition switch, said means being simple in construction and being adaptable to the circuitry of the automobile without requiring changes to the ignition system.

A still further object of the invention is to provide that the light switch be of such a construction that, if any of the electrical control components should burn out, the light switch will still be manually operable to provide control of the lights.

Other objects and advantages will be apparent from the following description in which reference is had to the accompanying drawings.

According to the invention a light switch of an automobile or other motor vericle is adapted to be manually closed and automatically latched or otherwise maintained in closed position. The latching means is adapted, upon opening the ignition switch by turning off the key to release the light switch and permit spring means to return it to open condition. The device is constructed to permit manual opening of the switch even though it has been latched in closed position, in order that the lights may be manually turned off with the motor running if desired.

Figure 1:
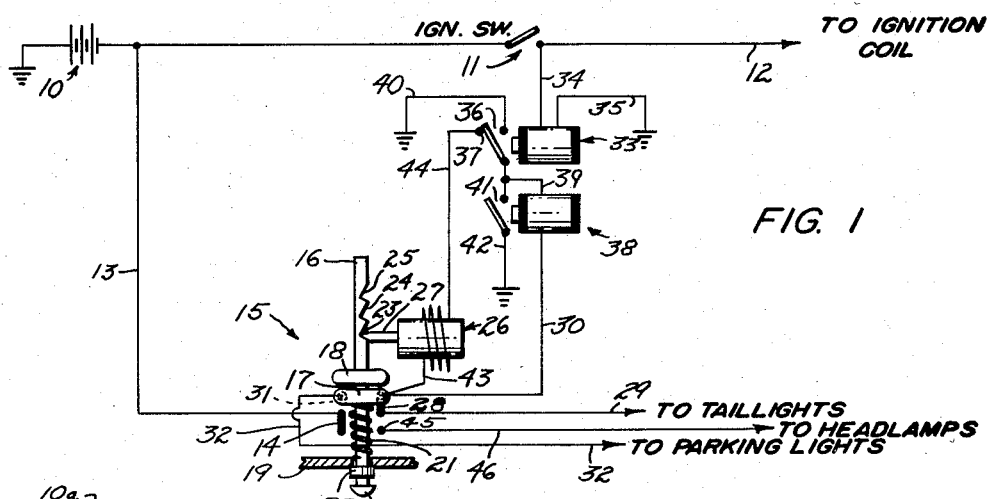
Fig. 1 is a schematic illustration of a preferred form of the invention in which a hold-in relay system and solenoid are utilized to effect control of a means for latching the light switch in closed position.

Referring now to the drawings, we have a battery 10, one pole of which is connected to ground and the other pole of which is connected by appropriate wiring to one side of an ignition switch 11. The switch 11, when closed, permits current to flow through a lead 12 to an ignition coil (not shown) of the ignition system of the automobile. As that part of the ignition system is not part of the invention, it will not be described. Current from the battery 10 for the headlights and parking lights is provided through a lead 13 connected to a terminal 14 of the light switch. The light switch is shown generally at 15. It should be understood that this light switch is merely representative of one type that may be used. Obviously, rotary type switches, or switches with a different arrangement of terminals can be used without departing from the invention. Furthermore, push-pull switches of the type shown may have the dashboard dimming feature as is customary with some makes of cars, by providing that rod 16 be rotary, and have notches extending all the way around the rod. In the form of switch shown, the longitudinally movable rod 16 carries a pair of contact blades 17 and 18. These contact blades are fixed to the rod 16 and are insulated from one another. The rod 16 extends through a portion of a dashboard 19 and has on its outwardly extended end a knob 20 which may be grasped by the operator for manual operation. Intermediate the blade 17 and dashboard, and surrounding the rod 16 there is a spring 21 which normally tends to urge the rod inwardly of the dashboard 19. The rod 16 may also carry a collar 22 near the knob to limit the extent of inward movement thereof. The rod 16 is notched at 23, 24, and 25 for purposes which will become apparent shortly.

A solenoid 26 carries on its armature a detent 27 which engages with one of the notches 23, 24 or 25.

In order to best understand the operation of the apparatus of Fig. 1, an explanation of examples of certain conditions of use is necessary. Let us first assume that the condition exists in which the automobile is being driven in daylight and dusk is approaching. The ignition switch 11 will of course be closed and the light switch 15 will be in the position shown in Fig. 1. The operator now wishes to turn on his parking lights only, since his purpose at this time is to make other drivers aware of his presence. At this time it is still light enough that he doesn't need his headlights to illuminate the road ahead. When turning on his parking lights, the operator grasps the knob 20 and pulls it outwardly until the detent 27 of the solenoid 26 moves from notch 23 to 24. The detent 27 is spring-urged toward the rod 16 and therefore will slide up the incline of the notch 23 and drop into the notch 24. The blade 17 now connects terminal 14 with a terminal 28 and in so doing, provides current flow through the lead 13 across the contact blade 17 to a lead 29 to the tail lights. It will be noticed that the terminal 28 extends between the lead 29 and a lead 30. When the rod 16 was moved to cause the contact blade 17 to connect the leads 13 and 29, the contact blade 18 carried on the rod 16 moved to the position occupied by the blade 17 in Fig. 1, and therefore connects the terminal 28 with a terminal 31. Thus, current also flows through the lead 13, contact 17, across the terminal 28, the contact blade 18, and through a lead 32 to the parking lights.

The control system operation for that portion of the example just stated is as follows: Before the parking lights were turned on, the coil of a relay 33 would have been energized through the closed ignition switch 11, a lead 34, and a lead 35 connected to ground. The relay 33 has a pair of normally-open contacts 36 and a pair of normally-closed contacts 37. When energized, the contacts 36 close and the contacts 37 open. The relay 33 serves a "setting" function to permit automatic opening of the light switch 15 if the lights are on when the ignition switch is subsequently turned off. Now, returning to our first example in which the parking lights have been turned on while driving at dusk, it will be seen that when the light switch was closed, current flowed through the lead 13, contact blade 17, terminal 28, lead 30, to the coil of a relay 38, through a lead 39, across the now-closed contacts 36 of the relay 33, and then through a lead 40 connected to ground. The energization of the relay 38 resulting from the operation of the light switch 15 to turn on the lights closes its normally-open contacts 41 so that the relay 38 may hold itself energized across the now-closed contacts 41 and through a lead 42 connected to ground. With these conditions and nothing more, let us assume the driver reaches his destination and parks the car. Turning off the ignition key opens the switch 11 and causes deenergization of the relay 33. The previously-closed contacts 36 then open, and the contacts 37 close. The coil of relay 38 remains energized however, through the lead 39, contacts 41 and lead 42 to ground. Upon closing of the contacts 37 current flows through the lead 13, contact blade 17, terminal 28, lead 43 to the solenoid 26, then through a lead 44, the now-closed contacts 37, closed contacts 41, and through lead 42 to ground. The solenoid 26 is therefore energized upon the closing of contacts 37 and thus causes the detent 26 to move rightwardly and disengage from the notch 24. When this occurs, the spring 21 urges the rod 16 inwardly of the dashboard and opens the light switch 15. Since the contact blade 17 no longer connects the tail lights and parking lights to the battery these lights automatically go off. In addition, current no longer flows through the lead 30, and the relay 38 becomes deenergized to permit its contacts 41 to open. The entire system is thus extinguished.

If the driver wished to park with his parking lights on he would merely have to pull the knob 20 until the detent 27 again became engaged with the notch 24. This would restore current flow to the parking lights and tail lights. However, the relay 38 would not become energized since both the contacts 36 and 41 are open. The parking lights may remain on as long as desired until the operator wishes to manually turn them off. In such case, having gone to the trouble of turning them on, he will be aware that they are on and not forget them.

If, in the previous example, the headlights rather than the parking and tail lights were turned on while driving, the detent 27 will have engaged in the notch 25, the knob 20 of course, having been pulled further outwardly. Under such condition, the contact blade 17 will connect terminal 14 to a terminal 45 and permit current to flow through a lead 46 to the headlamps. Contact blade 18 will assume a position to connect terminals 14 and 28 and thus supply current to the tail lights and also to the relay 38 and the solenoid 26 as, and at the times previously mentioned.

The operational description thus far supplied for the modification of Fig. 1 has been under that condition in which the lights were turned on while the ignition was on. If the reverse of this was true, i. e., the lights were turned on first, the ultimate result would be the same. The lights would still be automatically turned off when the ignition key was subsequently turned off. In this example let us suppose a person goes to his car while it is dark, first turns on the parking lights to illuminate the dashboard and then inserts the key and starts the engine. When he first turned on the lights, the same condition would exist as that mentioned in the first example when the operator turned on his parking lights to park on the street, i. e., the lights will go on, but relay 38 and solenoid 26 will be unaffected. Now, the ignition switch 11 is closed, the relay 33 is immediately energized and contacts 36 close. Closing of contacts 36 permits energization of the relay 38 at this time through the lead 39, contacts 36 and lead 40 as in the earlier example. The extinguishing operation of the control system is the same as before.

It can be seen that with the apparatus of Fig. 1 the relay 33 is energized whenever the ignition is on, and both relays 33 and 38 are energized when both the ignition switch 11 and light switch 15 are closed. The solenoid 26 operates only momentarily to automatically release the rod 16 when the ignition switch 11 is opened with either the parking lights or headlights on.

Figure 2:
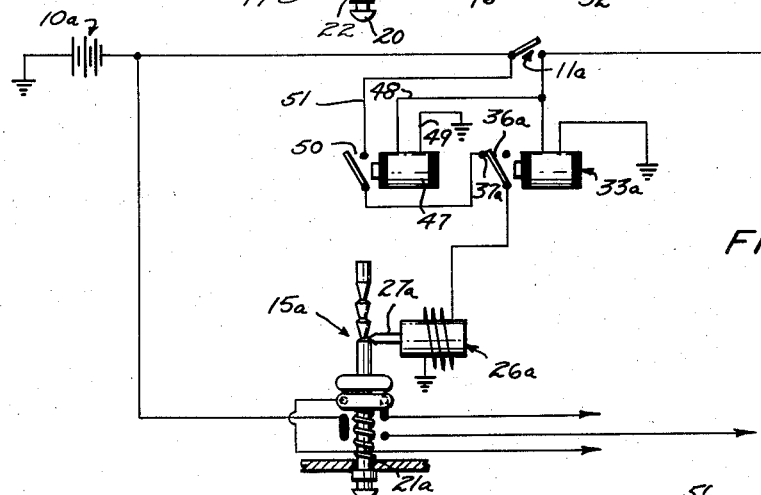
Fig. 2 shows a modification of the invention in which a time-delay relay system is used to perform the same function, and, Fig. 3 illustrates a still further modification in which latch relays are used for performing the control function of the invention.
Figure 3:
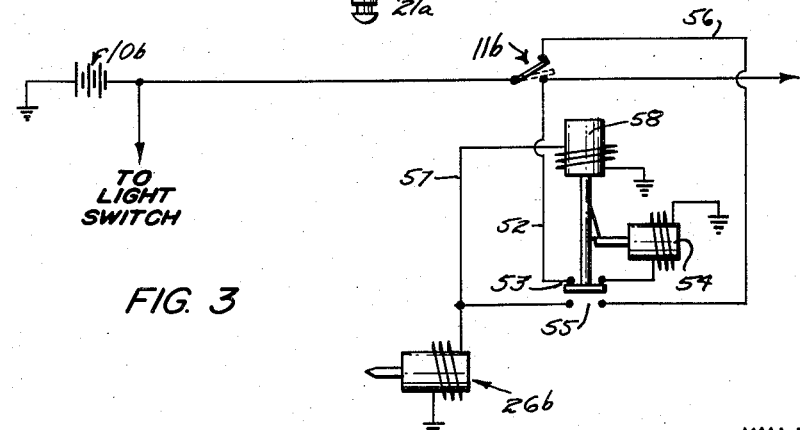

Figs. 2 and 3 illustrate two of several possible additional modifications of means for carrying out the invention. In Fig. 2 it will be noted that many of the parts correspond to those of Fig. 1. For instance it will be seen that when ignition switch 11a is closed, the coil of a relay 33a will be energized to open contacts 37a and close contacts 36a. In this modification, however, closing of the ignition switch also energizes the coil of a relay 47 through a lead 48 and a lead 49 to ground. Relay 47 has contacts 50 which are slow-closing and slow-opening. This slot action may be accomplished by a dash-pot or any other means well known in the art. The reason for the slow action of the contacts 50 is to prevent possible energization of the solenoid 26a when the ignition switch 11a is closed. If activation of the solenoid 26a was permitted, and if the lights were turned on before the ignition switch was closed, the lights would be turned off again when the ignition switch was operated. By providing that the contacts 50 be slow-closing, there is an assurance that the contacts 37a are opened before contacts 50 are closed. The solenoid 26a may cooperate with the light switch 15a in the same manner as described in Fig. 1. Energization of the solenoid 26a to release the light switch 15a and permit the spring 21a to return the light switch to the off position is accomplished as follows: Assuming both the ignition switch 11a and the light switch 15a are closed, regardless of the order in which they are closed, opening of the ignition switch 11a deenergizes both relays 33a and 47. Contacts 37a are closed before slow-opening contacts 50 open. This establishes a circuit from the battery 10a through a lead 51, across both of the closed contacts 50 and 37a to the solenoid 26a. Detent 27a thereupon releases from the notch with which it was engaged, and the spring 21a opens the light switch 15a as described in the Fig. 1 modification.

It will be noticed that in the forms of the invention described in Figs. 1 and 2 no changes to the ignition switch or system are necessary. In the form about to be described in Fig. 3, an additional contact is provided at the ignition switch 11b. In Fig. 3 a solenoid 26b functions with a light switch which may be of the type shown at 15 or 15a in Figs. 1 and 2 respectively. In this modification closing of the ignition switch 11b causes current to flow through a lead 52 across previously closed contacts 53 to a latch-in coil 54. Coil 54 releases contacts 53 in a manner well known in the operation of latch relays. When contacts 53 open, a second set of contacts 55 are closed. Such closing of contacts 55 has no immediate effect but serves to set up the control system for subsequent operation of solenoid 26b when the ignition switch is opened. Opening of contacts 53 deenergizes latch-in coil 54. If both the light switch with which the solenoid 26b cooperates and the ignition switch are closed, opening of the ignition switch will energize the solenoid 26b and release the light switch as follows: When the ignition switch 11b is moved to its open or full-line position, current from the battery 10b flows across the ignition switch, through a lead 56, across the now-closed contacts 55 to the solenoid 26b. It also flows through a lead 57 to the coil of a relay 58 and then to ground. The relay 58 may be slow-operating if desired. When the relay 58 is energized, contacts 55 are opened, contacts 53 are closed, and the latter contacts are latched in by the latch-in coil 54 in the usual manner. Opening of contacts 55 breaks current to solenoid 26b and relay 58. Closing of contacts 53 sets the stage for energizing the latch-in coil 54 to release the contacts 53 the next time the ignition switch 11b is closed.

Various modifications may be made without departing from the spirit and scope of the invention. For example, the ignition switch may be provided with a contact similar to the extra contact in Fig. 3, which contact may be swept across by a contactor only in turning the switch to the off position, means being provided to prevent closing of those contacts when the ignition switch is turned toward the on position. Furthermore, instead of the latch and detent means shown for the light switch, the solenoid may be connected to the light switch by linkage or other means.

The invention may also be utilized to automatically turn off a radio, heater, etc., or perform some function such as closing vents or windows. Where such functions are performed in response to turning off the ignition or corresponding switch, they are considered within the purview of this invention. By corresponding switch is meant a door-operated switch or some other means which must be actuated when an operator leaves his automobile or turns off the ignition. For example, the switch 11b of Fig. 3 may well be a door-switch controlled by the operator's door. In this instance the lead to the ignition coil would be eliminated, but the control of the lights would still be the same. Further, in the Fig. 3 example, a starter switch may operate hold-in coil 54 when the starter switch is closed, and a door switch may energize relay 58 when the door is opened. Therefore these two switches may be made to do the job done by the ignition switch of the preferred form of the invention. Although it will be recognized that operation by a switch or switches other than the ignition switch may have some disadvantages, such as considered to be equivalent since the essence of the invention will still be present.

Having described our invention, we claim:

1. A control system for electrically operated apparatus of a vehicle having an engine and an ignition system therefor, switch means for said apparatus adapted to be manually closed or opened, a manually operable ignition switch for the ignition system of said vehicle, and means operated in response to opening of said ignition switch, said means being operably connected to the apparatus switch for automatically opening said latter switch whenever it is closed at the time the ignition switch is opened, and enabling manual operation at all times of said apparatus switch to opened or closed position independently of the opened or closed condition of the ignition switch.

2. A control system according to claim 1 wherein means is provided for maintaining the apparatus switch means in closed position when manually closed, said means enabling manual opening of said apparatus switch while the ignition switch is closed.

3. In a control system for an electrically operated device constituting a portion of the electrical system of a motor vehicle, said motor vehicle comprising an engine, a source of electrical power, an ignition system connecting the source to the engine, and a manually operable ignition switch controlling the ignition system, the combination of electrical connections from said source to said device, a control switch for said device manually operable to opened and closed positions and means operable only in response to manual opening of said ignition switch for opening the switch means for the device and thereby discontinuing the application of electrical power thereto.

4. A control system according to claim 3 wherein said operable means comprises a system of relays adapted to permit opening of said device switch means only when the ignition switch is opened.

5. A control system for the exterior lighting system of an automobile having an engine and an ignition system therefor, a light switch manually operable to closed position, means maintaining the light switch in closed position when so operated, a manually operable ignition switch for said ignition system, and means operated in response to opening of said ignition switch when said light switch is closed for opening the light switch, said means being operably connected to the means maintaining the light switch in closed position, said maintaining means and said means operated in response to opening of the ignition switch enabling manual closing of said light switch when the ignition switch is open.

6. In a control system for electrically operated apparatus of a vehicle having an engine and an ignition system therefor, in combination, a first electrical circuit for said ignition system including an ignition switch manually operable to closed and opened positions, a second electrical circuit for said apparatus in parallel with the first circuit and including a normally open switch manually operable to closed position, means maintaining the apparatus switch closed when manually operated to closed position, and means settable in response to closing of said ignition switch and operable in response to opening of that switch to automatically open the apparatus switch, said last named means being operable only in response to opening of the ignition switch next after having been set by closing of that switch.

7. A control system according to claim 6 wherein the settable means actuates said maintaining means to release the apparatus switch.

8. A control system according to claim 6 wherein said apparatus switch is manually operable to both closed and opened positions at all times independently of the "on" or "off" condition of the ignition system, said maintaining means holding the apparatus switch in the position to which manually operated.

9. A control system according to claim 6 wherein said apparatus comprises headlights and parking lights of the vehicle, and wherein said apparatus switch is maintained either in positions corresponding thereto or in "off" position, said switch being manually operable between any of its positions independently of the condition of the ignition system, but automatically operable to "off" position if held in one of the other positions when the ignition switch is manually opened.

10. A control system according to claim 6 wherein said settable means comprises electrical contacts closed by opening the ignition switch and said maintaining means comprises an electrically operated solenoid operable in response to closing of said contacts.

11. A control system according to claim 10 wherein said electrical contacts are solenoid operated.

12. A control system according to claim 7 including means resiliently urging the apparatus switch to open position when released by said maintaining means.

13. A control system according to claim 10 wherein said settable means comprises a hold-in circuit with normally open contacts which are closed in response to closing of said apparatus switch, said last named contacts being in series with said electrical contacts whereby closing of said electrical contacts will close the circuit to the electrically operated solenoid, and said hold-in circuit being on that side of the apparatus switch remote from the power supply whereby opening of the apparatus switch upon actuation of said maintaining means opens the normally open contacts of the hold-in circuit.

14. A control system according to claim 6 wherein said maintaining means includes a solenoid in parallel with said second circuit, and wherein said settable means comprises at least two contacts in series in the solenoid circuit, all of said contacts being in closed position momentarily only upon opening of the ignition switch when the apparatus switch is also closed and at least one of said contacts being open at all other times.

15. A control system for electrically operated apparatus of a vehicle having an engine and an ignition system therefor, a first switch for said apparatus adapted to be manually closed or opened, a second switch, and means operated in response to opening of said second switch, said last-named means being operably connected to the apparatus switch for automatically opening the apparatus switch whenever it is closed at the time the second switch is opened, and enabling manual operation of said apparatus switch at all times to opened or closed position independently of the opened or closed condition of the second switch.

16. A control system according to claim 15 wherein means is provided for maintaining the apparatus switch in closed position when manually closed, opening of said second switch causing release of said maintaining means and thereby opening said apparatus switch.

17. In a control system for electrically operated apparatus of a vehicle having an engine and an ignition system therefor, in combination, an electrical circuit for said apparatus and including a normally open switch manually operable to closed position, a control circuit for the apparatus circuit including a switch the operation of which performs the control function, means maintaining the apparatus switch closed when manually operated to closed position, and means in said control circuit settable in response to closing of the control switch and operable in response to opening of the control switch to automatically open the apparatus switch next after having been set by closing of the control switch.

References Cited in the file of this patent

UNITED STATES PATENTS

| | | |
|---|---|---|
| 2,669,664 | Poznik | Feb. 16, 1954 |
| 2,806,150 | Poznik | Sept. 10, 1957 |